3,654,234
PROCESS FOR PREPARATION OF POLYESTERS OF DICARBOXYLIC ACIDS AND GLYCOLS IN THE PRESENCE OF CRYSTALLINE GERMANATE CATALYSTS
Lambert Gaston Jeurissen, Edegem, Belgium, assignor to Gevaert-Agfa N.V., Mortsel, Belgium
No Drawing. Filed July 1, 1969, Ser. No. 838,347
Claims priority, application Great Britain, Nov. 29, 1968, 56,896/68
Int. Cl. C08g 17/15
U.S. Cl. 260—75 R  9 Claims

ABSTRACT OF THE DISCLOSURE

An improved catalyst for the polycondensation of a glycol dicarboxylate and the process for the preparation of film-forming polyesters by the polycondensation of a dicarboxylate in the presence of said catalyst are described. The catalyst is a trihydrogen germanate (IV) of an alkali metal, an alkaline earth metal, or an ammonium group. The film-forming polyester made by the process utilizing said catalyst has improved physical properties including color and stability.

---

The present invention relates to improvements in the manufacture of polyesters, in particular to improvements in the manufacture of highly polymeric polyethylene terephthalate, in which a polycondensation reaction is carried out in the presence of a germanium compound as catalyst.

The prior art contains a large number of disclosures concerning the use of catalysts in the manufacture of fibre- and film-forming linear condensation type polyesters. Among numerous useful catalysts for preparing polyesters are zinc acetate, antimony trioxide, germanium dioxide, titanium compounds and compounds of other metals.

It is known from the United States patent specification 2,578,660 of Lawrence Arthur Auspos and Jane Bowen Dempster, issued Dec. 18, 1951 to use germanium dioxide as catalyst in the above-mentioned polycondensation reaction. Though high molecular weight compounds can be prepared with germanium dioxide as catalyst, the method described is nevertheless impracticable as a result of the very low solubility of germanium dioxide in the reaction mixture, which results in undissolved catalyst remaining in the polymer. The low effective catalyst concentration causes long reaction times and the remaining undissolved catalyst will, during working up of the polymer, obviously entail difficulties such as clogging of the filtering apparatus, on melting for extrusion purposes. Moreover, filtering off the very fine undissolved catalyst particles is difficult. If the polymer is used for the fabrication of film, the film will contain inclusions in the form of irregularly distributed points or be hazy. This is inadmissible if the film is to be used as a film base for photographic purposes.

Other germanium compounds have now been found, which are soluble in the polycondensation reaction mixture and moreover are readily soluble in glycols, and which can be used as catalysts in the preparation of polyesters.

According to the invention, there is provided a process for the preparation of polyesters of a dicarboxylic acid and a glycol, which comprises the polycondensation of a glycol dicarboxylate in the presence as a catalyst of a crystalline germanate which is substantially free from chlorine and comprises an ionic ratio of 0.4 to 0.6 of an alkali metal or of ammonium, or an ionic ratio of 0.2 to 0.3 of an alkaline earth metal with respect to the germanium present.

These crystalline germanates are obtained by subjecting crystalline, hexagonal germanium dioxide to a digestion in an aqueous solution of a strong base such as an alkali metal hydroxide or ammonium hydroxide or an alkaline earth metal hydroxide such as calcium hydroxide or mixtures thereof.

The resulting suspension of germanate is filtered and dried at low temperatures. Very interesting catalysts according to the invention are obtained when the germanium dioxide is digested in an aqueous solution of sodium hydroxide, potassium hydroxide, ammonium hydroxide or calcium hydroxide.

Particularly valuable are crystalline germanates of the formula $MeH_3Ge_2O_6$ wherein Me is an alkali metal such as sodium or potassium.

For facility's sake all these germanates will be named "crystalline germanates" in the following description.

The process of the invention may be carried out by using direct esterification of a dicarboxylic acid, e.g. terephthalic acid and a glycol, e.g. ethylene gylcol, or a conversion of a dicarboxylic acid and an alkylene oxide, e.g. ethylene oxide, to form the glycol dicarboxylate monomer. Very good results are obtained by a process in which a glycol discarboxylate is obtained by the transesterification of a dialkyl ester of a dicarboxylic acid with a glycol and a subsequent polycondensation step, using the crystalline germanates as catalyst.

The glycol dicarboxylate used in the polycondensation step is preferably an ethylene glycol dicarboxylate, more preferably ethylene glycol terephthalate, although other glycol dicarboxylates and especially other glycol terephthalates may be used.

The polycondensation can be effected batch-wise or as a continuous process.

In the transesterification reaction hereinbefore described any transesterification catalyst can be used, but preferably one that does not colour the polyester to be formed, e.g. compounds of alkali metals and alkaline earth metals, praseodymium, samarium, cerium, lanthanum, or salts of zinc, cadmium or manganese, e.g. those described in the United Kingdom patent specification 816,215 filed June 24, 1955 by Gevaert Photo-Producten N.V.

When the polyester is produced by a two-stage process involving a transesterification step followed by a polycondensation step as hereinbefore described, the crystalline germanate may be added in both stages, or in the polycondensation stage only. It is preferred that the crystalline germanate is present in proportions to provide a concentration in the reaction mixture higher than 0.001% e.g. up to 0.05% by weight, calculated on the weight of glycol dicarboxylate monomer present. Higher concentrations provide no advantage because no improvement of the polycondensation rate is obtained.

The solubility of the crystalline germanates in glycols, especially in ethylene glycol, at normal pressure and at slightly elevated temperatures is rather high. Concentrations up to 20% by weight can easily be reached, which are much higher than 0.001 to 0.05% by weight needed as catalyst in a polycondensation reaction as described above. Accordingly, the crystalline germanate may be added as such in powdered form to the reaction mixture in which, at least until the beginning of the polycondensation step, an excess of glycol is always present.

In a very interesting embodiment of the process according to the invention the crystalline germanate is dissolved separately in a glycol having the same formula as the glycol component of the glycol dicarboxylate to be formed. The preformed solution of crystalline germanate in glycol may contain much higher concentration of germanium compound, for instance between 0.15% and 10% by weight calculated on the weight of glycol solvent present. These solutions are very stable and can be kept for a long time without fear that dissolved germanate might precipitate. Such solutions may be used as stock solutions, which at any time after dilution may serve in the polyester preparation. In this way, the catalyst solution can be added before or during the transesterification and before or during the polycondensation reaction. The preparation of such stable concentrated preformed solutions which can be performed at normal pressure and at slightly elevated temperatures means that they do not have to be made up before each run of polyester manufacture and that no special pressure apparatus is needed, which also results in economies in plant requirements.

Certain compounds may also be added to the reaction melt to attain desired effects. For instance stabilising agents such as phosphorus compounds, delustering agents, or colouring agents such as anthraquinone dyes may be added.

When compared with other known polycondensation catalysts, such as antimony compounds, titanium compounds and tin compounds, the crystalline germanates used in the procedure according to our invention have the advantage of allowing the preparation of nearly colourless and very clear polyesters. If the polyester is intended for the preparation of films to be used as photographic supports, this clearness and absence of colour are of utmost importance. Another advantage of the use of the crystalline germanates as polycondensation catalysts resides in the fact that the films prepared from the polyesters have very good stretching properties.

The examples given hereinafter especially describe the preparation of polyethylene terephthalate wherein sodium-, potassium-, ammonium- or calcium trihydrogen germanate (IV) is used as a polycondensation catalyst. Other crystalline germanates obtained by digesting crystalline, hexagonal germanium dioxide in an aqueous solution of an alkali metal hydroxide or an alkaline earth metal hydroxide can also be used as catalysts. The process of the invention is not restricted, however, to the preparation of polyethylene terephthalate. According to the same process, other glycols can also be used, e.g. 1,4-di(hydroxymethyl)-cyclohexane. In this way a large number of different nearly colourless and very clear polyesters can be prepared from a glycol of the same structure as the glycol component of the glycol dicarboxylate, since the terephthalic acid itself can be replaced partially or wholly in the reaction by other dibasic acids such as, e.g., isophthalic acid, sebacic acid, or adipic acid.

The following examples are cited to illustrate the invention. They are not intended to limit it in any way. In these examples the inherent viscosity $\eta_{inh}$, which is a measure of the degree of polycondensation, is calculated from the equation:

$$\eta_{inh} = \frac{\ln \eta_{rel}}{c}$$

wherein $\eta_{rel}$ (the relative viscosity) is found from:

$$\eta_{rel} = \frac{\text{flow time of solution}}{\text{flow time of solvent}}$$

and wherein $c$ is the concentration.

$\eta_{rel}$ is determined at 25° C. for a solution having a concentration $c$ of 0.5 g. of polyester per 100 ml. of a 60:40 mixture of phenol and sym.-tetrachloroethane.

The crystalline melting point of the polymer is determined by heating a crystallised sample of polyester on the heating stage of a polarising microscope. The temperature of the heating stage is raised at a rate of 0.8° C./min. The crystalline melting point is the temperature, at which between crossed nicols the last trace of birefringence disappears.

Differences in the melting point of subsequent preparations of polyesters are mainly caused by fluctuations in their diglycol content (diethylene glycol content in the case of polyethylene dicarboxylates). The higher this diglycol content, the lower is the melting point of the polyester in consequence of the internal plasticization of the polyester by the free diglycol present. Accordingly, when a particular polyester should have a high melting point, its diglycol content should be very low.

At the end of the polycondensation period the colour of the molten polyester is measured in a Lovibond Tintometer and recorded in terms of the Lovibond scale. This scale consists of permanent glass filters graduated in a strictly linear scale, from the palest perceptible colour to a fully saturated one, in the three subtractive primary colours red, yellow, and blue. By selecting suitable combinations from these scales, any colour, as well as grey to black, can be matched. This method has been described in "Colorimetric Chemical Analytical Methods," 2 volumes of a looseleaf textbook published by The Tintometer Ltd., Salisbury, England.

EXAMPLE 1

38.8 g. of dimethyl terephthalate, 27 g. of ethylene glycol, 5.4 mg. of sodium trihydrogen germanate (IV) ($1.10^{-4}$ mole/mole of dimethyl terephthalate) and 16.5 mg. of manganese monomethyl terephthalate ($2.10^{-4}$ mole/mole of dimethyl terephthalate) were placed in a glass polymerisation tube having an inside diameter of 25 mm. The reactants were heated for 3½ h. at 197° C. under atmospheric pressure. A continuous stream of dry nitrogen was introduced through a capillary tube reaching to the bottom of the reaction tube. The ester interchange reaction being finished, the temperature was gradually raised in 30 min. to 282° C., and the unreacted ethylene glycol was distilled off. Subsequently 13 mg. of triphenyl phosphate ($2.10^{-4}$ mole/mole of dimethyl terephthalate) were added as stabilizer. The pressure was reduced to 0.1 to 0.3 mm. of mercury, while the reaction mass was stirred under dry nitrogen. After 4 hours at 282° C., vacuum was released and polyethylene terephthalate polyester having an inherent viscosity of 0.70 dl./g. was obtained. The polyester was clear, and had a Lovibond colour combination of 0.3 red and 1.2 yellow. It melted at 266.5° C., which indicates a very low diethylene glycol content.

EXAMPLE 2

The process of Example 1 was repeated after having replaced, however, the 5.4 mg. of sodium trihydrogen germanate (IV) by 2.7 mg. or $5.10^{-5}$ mole/mole of dimethyl terephthalate. The inherent viscosity of the polyethylene terephthalate obtained was 0.67 dl./g. The polyester was clear, had a Lovibond colour combination of 0.1 red and 1.1 yellow, and melted at 266.5° C., thus indicating a very low diethylene glycol content.

EXAMPLE 3

The process of Example 1 was repeated after having replaced, however, the 5.4 mg. of sodium trihydrogen germanate (IV) by 1.4 mg. or $2.5 \times 10^{-5}$ mole/mole of dimethyl terephthalate. The inherent viscosity of the polyethylene terephthalate obtained was 0.654 dl./g. The polyester was clear, and had a Lovibond colour combination of 0.7 yellow. It melted at 266° C., which indicates a very low diethylene glycol content.

EXAMPLE 4

38.8 g. of dimethyl terephthalate and 27 g. of ethylene glycol were placed in a glass polymerisation tube having an inside diameter of 25 mm., whereupon 9.8 mg. of manganous acetate tetrahydrate ($2.10^{-4}$ mole/mole of dimethyl terephthalate) were added. The reactants were heated for 1½ hours at 197° C. under atmospheric pressure. A continuous stream of dry nitrogen was introduced through a capillary tube reaching to the bottom of the reaction tube. The ester interchange reaction being finished, the temperature was gradually raised in 30 min. to 282° C., and the unreacted ethylene glycol was distilled off. Subsequently 5.4 mg. of sodium trihydrogen germanate (IV) ($1.10^{-4}$ mole/mole of dimethyl terephthalate) were added. The pressure was reduced to 0.1 to 0.3 mm. of mercury while the reaction mass was stirred under dry nitrogen.

After 3 hours at 282° C., vacuum was released and polyethylene terephthalate polyester having an inherent viscosity of 0.68 dl./g. was obtained. The polyester was clear, and had a Lovibond colour combination of 0.4 red and 1.6 yellow. It melted at 267° C., which indicates a very low diethylene glycol content.

EXAMPLE 5

38.8 g. of dimethyl terephthalate and 27 g. of ethylene glycol were placed in a glass polymerisation tube having an inside diameter of 25 mm., whereupon 8.8 mg. of zinc acetate dihydrate ($2.10^{-4}$ mole/mole of dimethyl terephthalate) were added. The reactants were heated for 2 hours at 197° C. under atmospheric pressure. A continuous stream of dry nitrogen was introduced through a capillary tube reaching to the bottom of the reaction tube. The ester interchange reaction being finished, the temperature was gradually raised over 30 min. to 282° C., and the unreacted ethylene glycol was distilled off. Subsequently 5.4 mg. of sodium trihydrogen germanate (IV) ($1.10^{-4}$ mole/mole of dimethyl terephthalate) and 13 mg. of triphenyl phosphate ($2.10^{-4}$ mole/mole of dimethyl terephthalate) were added. The pressure was reduced to 0.1 to 0.3 mm. of mercury, while the reaction mass was stirred under dry nitrogen. After 3 hours at 282° C. vacuum was released, and polyethylene terephthalate polyester having an inserent viscosity of 0.69 dl./g. was obtained. The polyester was clear and had a Lovibond colour combination of 0.3 red and 1.4 yellow. It melted at 265° C. which indicates a low diethylene glycol content.

EXAMPLE 6

A catalyst solution was made by heating 5 g. of sodium trihydrogen germanate (IV) and 100 cc. of ethylene glycol for 15 min. at 100° C. A clear 5% solution was obtained. An amount of 0.11 ml. of this solution containing 5.4 mg. of the germanium compound, together with 38.8 g. of dimethyl terephthalate and 27 g. of ethylene glycol were placed in a glass polymerisation tube having an inside diameter of 25 mm. Thereupon 9.8 mg. of manganous acetate tetrahydrate ($2.10^{-4}$ mole/mole of dimethyl terephthalate) were added. The reactants were heated for 3½ hours at 197° C. under atmospheric pressure. A continuous stream of dry nitrogen was introduced through a capillary tube reaching to the bottom of the reaction tube. The ester interchange reaction being finished, the temperature was gradually raised in 30 min. to 282° C., and the unreacted ethylene glycol was distilled off. Subsequently 13 mg. of triphenyl phosphate ($2.10^{-4}$ mole/mole of dimethyl terephthalate) were added as a stabilizer. The pressure was reduced to 0.1 to 0.3 mm. of mercury, while the reaction mass was stirred under dry nitrogen. After 3 hours at 282° C. vacuum was released, and polyethylene terephthalate polyester having an inherent viscosity of 0.66 dl./g. was obtained. The polyester was clear, and had a Lovibond colour combinaation of 0.2 red and 1.2 yellow. It melted at 266° C., which indicates a very low diethylene glycol content.

EXAMPLE 7

388 parts of dimethyl terephthalate (2 moles) and 275 parts of ethylene glycol (4.4 moles) were placed in a stainless steel autoclave equipped with a stirrer, a gas inlet and a rectifying column. After having added 100 mg. of manganous acetate tetrahydrate, the mixture was stirred and heated for 3 h. at 197° C. under atmospheric pressure, while a continuous stream of dry nitrogen was introduced. The ester-interchange being finished, 55 mg. of sodium trihydrogen germanate (IV) were added as a 5% solution in ethylene glycol, prepared as described in Example 6. Subsequently, the temperature was gradually raised in 1 h. to 282° C., and the unreacted ethylene glycol was distilled off. The pressure was reduced to 0.1 to 0.3 mm. of mercury. After 3 hours at 282° C. vacuum was released, and polyethylene terephthalate polyester having an inherent viscosity of 0.68 dl./g. was obtained. The polyester was clear and nearly colourless, and had a Lovibond colour combination of 0.1 red and 0.7 yellow. It melted at 266° C., which indicates a very low diethylene glycol content.

EXAMPLE 8

The process of Example 1 was repeated, after having replaced, however, the 5.4 mg. of sodium trihydrogen germanate (IV) by 5.7 mg. of potassium trihydrogen germanate (IV) ($1.10^{-4}$ mole/mole of dimethyl terephthalate). The inherent viscosity of the polyethylene terephthalate obtained was 0.68 dl./g. The polyester was clear, and had a Lovibond colour combination of 0.3 red and 1.2 yellow. It melted at 266.5° C. which indicates a very low diethylene glycol content.

EXAMPLE 9

The process of Example 4 was repeated after having replaced, however, the 5.4 mg. of sodium trihydrogen germanate (IV) by the simultaneous addition of 5.3 mg. of calcium trihydrogen germanate (IV) ($5.10^{-5}$ mole/mole of dimethyl terephthalate) and 12.4 mg. of triphenyl phosphite ($2.10^{-4}$ mole/mole of dimethyl terephthalate) to the polycondensation mixture. The inherent viscosity of the polyethylene terephthalate obtained was 0.70 dl./g. The polyester was clear, and had a Lovibond colour combination of 0.4 red and 1.0 yellow. It melted at 265° C. which indicates a low diethylene glycol content.

EXAMPLE 10

The process of Example 9 was repeated after having replaced, however, the 5.3 mg. of calcium trihydrogen germinate (IV) by 5.4 mg. of ammonium trihydrogen germanate (IV) ($1.10^{-4}$ mole/mole of dimethyl terephthalate). The inherent viscosity of the polyester obtained was 0.71 dl./g. The polymer was clear and had a Lovibond colour combination of 0.3 red and 1.0 yellow. It melted at 266° C. which indicates a low diethylene glycol content.

EXAMPLE 11

A catalyst solution was made by heating 2.80 g. of sodium trihydrogen germanate (IV) and 100 ml. of ethylene glycol for 15 min. at 100° C. A clear and stable solution was obtained.

In a stainless steel autoclave equipped with a stirrer, a gas inlet and a rectifying column, were placed the following ingredients:

19.4 kg. of dimethyl terephthalate
12.4 kg. of ethylene glycol
4.17 g. of manganous acetate tetrahydrate ($2.10^{-4}$ mole/mole of dimethylterephthalate).

The process of Example 7 was followed, but after the ester interchange the previously prepared sodium trihydrogen germanate (IV) solution was added, containing 2.80 g. of said compound ($1.10^{-4}$ mole/mole of dimethylterephthalate), together with 6.59 g. of triphenyl phosphate ($2.10^{-4}$ mole/mole of dimethyl terephthalate). The polyester obtained had an inherent viscosity of 0.70 dl./g. The polyester was clear and nearly colourless, and had a Lovibond colour combination of 0.2 red and 0.8 yellow. It melted at 267° C., which indicates a very low diethylene glycol content.

I claim:
1. In the process for the preparation of film-forming polyesters of a dicarboxylic acid and a glycol by the polycondensation of a glycol dicarboxylate the improvement comprising carrying out the polycondensation of the glycol dicarboxylate in the presence of a catalytically effective amount of a crystalline germanium catalyst for said polycondensation, said catalyst being selected from the group consisting of a catalyst having the formula MeH$_3$Ge$_2$O$_6$ wherein Me is an alkali metal or an ammonium group, and an alkaline earth metal trihydrogen germanate (IV) having an ionic ratio of 0.2 to 0.3 of the alkaline earth metal with respect to germanium present, said catalyst being substantially free of chlorine.

2. The process of claim 1 wherein said catalyst is present in an amount of from 0.001 and 0.05 percent by weight of the glycol dicarboxylate.

3. The process of claim 1 wherein said glycol is ethylene glycol.

4. The process of claim 3 wherein said dicarboxylic acid is terephthalic acid.

5. The process according to claim 1 wherein said catalyst is present in the form of a preformed solution of said catalyst in a glycol having the same formula as the glycol component of the glycol dicarboxylate.

6. The process of claim 1 wherein said catalyst is sodium trihydrogen germanate (IV).

7. The process of claim 1 wherein said catalyst is potassium trihydrogen germanate (IV).

8. The process of claim 1 wherein said catalyst is calcium trihydrogen germanate (IV).

9. The process of claim 1 wherein said catalyst is ammonium trihydrogen germanate (IV).

References Cited

UNITED STATES PATENTS 3,459,711  8/1969  Hartmann et al. _____ 260—75

OTHER REFERENCES

Pascal, Nouveau Traité de Chimie Minerale, Tome VIII, Troisieme Fascicule published 1963, Mason et. cie. Paris, France; title page and pages 118–120, 126, 130, 133–135.

WILLIAM H. SHORT, Primary Examiner

L. P. QUAST, Assistant Examiner

U.S. Cl. X.R.

23—24 R; 252—430, 461; 260—475 P